US011336127B2

(12) United States Patent
Muratov (10) Patent No.: US 11,336,127 B2
(45) Date of Patent: May 17, 2022

(54) CALIBRATION OF FOREIGN OBJECT DETECTION IN WIRELESS POWER SYSTEMS WITH AUTHENTICATION

(71) Applicant: MEDIATEK Singapore Pte. Ltd., Singapore (SG)

(72) Inventor: Vladimir A. Muratov, San Jose, CA (US)

(73) Assignee: MEDIATEK Singapore Pte. Ltd., Singapore (SG)

(*) Notice: Subject to any disclaimer, the term of this patent is extended or adjusted under 35 U.S.C. 154(b) by 0 days.

(21) Appl. No.: 16/987,192

(22) Filed: Aug. 6, 2020

(65) Prior Publication Data

US 2021/0050749 A1  Feb. 18, 2021

Related U.S. Application Data

(60) Provisional application No. 62/887,051, filed on Aug. 15, 2019.

(51) Int. Cl.
*H02J 50/80* (2016.01)
*H02J 50/12* (2016.01)
*H02J 50/60* (2016.01)
*H04W 12/06* (2021.01)

(52) U.S. Cl.
CPC .............. *H02J 50/80* (2016.02); *H02J 50/12* (2016.02); *H02J 50/60* (2016.02); *H04W 12/06* (2013.01)

(58) Field of Classification Search
CPC .. H02J 50/80; H02J 50/12; H02J 50/60; H02J 7/00045; H04W 12/06
See application file for complete search history.

(56) References Cited

U.S. PATENT DOCUMENTS

| 2006/0287763 | A1* | 12/2006 | Ochi | H02J 7/00036 |
| | | | | 700/231 |
| 2008/0197802 | A1* | 8/2008 | Onishi | H02J 50/12 |
| | | | | 320/106 |
| 2010/0225173 | A1* | 9/2010 | Aoyama | H02J 7/025 |
| | | | | 307/104 |
| 2011/0025265 | A1* | 2/2011 | Mochida | H02J 50/80 |
| | | | | 320/108 |
| 2015/0067042 | A1* | 3/2015 | Tong | H04L 51/28 |
| | | | | 709/203 |
| 2017/0324279 | A1 | 11/2017 | Kang et al. | |
| 2018/0097403 | A1* | 4/2018 | Jung | H02J 50/80 |
| 2018/0191190 | A1* | 7/2018 | Chu | H04B 5/0037 |

(Continued)

FOREIGN PATENT DOCUMENTS

| CN | 107872080 A | 4/2018 |
| CN | 109952503 A | 6/2019 |

(Continued)

OTHER PUBLICATIONS

Extended European Search Report dated Jan. 12, 2021 in connection with European Application No. 20190969.4.

*Primary Examiner* — Pinping Sun
(74) *Attorney, Agent, or Firm* — Wolf, Greenfield & Sacks, P.C.

(57) ABSTRACT

Apparatus and methods are described for performing wireless power transfer and foreign object detection with authentication at different power levels. The impact of time required for an authentication process to execute between transitions to different power levels is reduced.

12 Claims, 3 Drawing Sheets

(56) References Cited

U.S. PATENT DOCUMENTS

| | | | |
|---|---|---|---|
| 2018/0241257 A1 | 8/2018 | Muratov et al. | |
| 2019/0260240 A1 | 8/2019 | Kwon et al. | |
| 2019/0280534 A1* | 9/2019 | Park | H02J 50/10 |
| 2019/0348853 A1* | 11/2019 | Swan | H02J 9/005 |
| 2020/0266665 A1* | 8/2020 | Noh | H02J 7/00045 |

FOREIGN PATENT DOCUMENTS

| | | |
|---|---|---|
| CN | 110073574 A | 7/2019 |
| EP | 3 145 052 A1 | 3/2017 |
| EP | 3 451 491 A1 | 3/2019 |
| EP | 3 506 460 A1 | 7/2019 |
| EP | 3 544 151 A1 | 9/2019 |
| TW | 201208225 A | 2/2012 |
| TW | 201415755 A | 4/2014 |
| WO | WO 2017/213383 A1 | 12/2017 |
| WO | WO 2018/093099 A1 | 5/2018 |

* cited by examiner

CALIBRATION OF FOREIGN OBJECT DETECTION IN WIRELESS POWER SYSTEMS WITH AUTHENTICATION

CROSS-REFERENCE TO RELATED APPLICATIONS

This application claims priority to U.S. Provisional Patent application, Ser. No. 62/887,051, titled "CALIBRATION OF FOREIGN OBJECT DETECTION IN WIRELESS POWER SYSTEMS WITH AUTHENTICATION," and filed Aug. 15, 2019, which application is hereby incorporated by reference in its entirety.

BACKGROUND

1. Technical Field

The techniques described herein relate to wireless power delivery, detection of foreign objects in a wireless power transfer region, and to transitioning between different modes of operation.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Inductive WPTS typically operate in an allocated frequency range of several hundred kilohertz using frequency variation as a power flow control mechanism. MR WPTS typically operate on a single resonant frequency using input voltage regulation to regulate output power. In some applications, MR WPTS operate at a frequency of 6.78 MHz. Such systems can be used to power or charge consumer-electronic devices such as smartphones, calculators, cameras, and tablet computers, and may be used for other applications.

SUMMARY

Some wireless power transfer systems are capable of providing power wirelessly at high power levels (e.g., above 5 watts). In some cases, power levels of 15 watts or more may be transmitted wirelessly. When operating at high power levels, it is desirable to avoid delivering large amounts of power to foreign objects that could be located in a wireless power transfer region. In some cases, it is also desirable to assure that a wireless power receiver and/or wireless power transmitter are certified or qualified for transferring high power levels. As a result, authentication and foreign object detection steps may be executed prior to transferring high power levels. In some implementations, authentication and/or foreign object detection steps may be executed when a wireless power transmitter and wireless power receiver change from a first mode of operation (which may be a non-privileged mode that is available to all such devices) to a second mode of operation (which may be a privileged mode that is restricted to certain authorized devices). Embodiments described herein relate to methods for wireless power transfer at high levels of power when foreign objects might be present and also to transitions between non-privileged and privileged modes of operation by wireless power transmitters and wireless power receivers.

Some embodiments relate to control logic for a wireless power receiver that adapt the wireless power receiver to: establish wireless power reception during a wireless power transfer session from a wireless power transmitter at a first power level; execute an authentication process with the wireless power transmitter; if the authentication process completes successfully, send session attribute information to memory; receive session attribute information from the memory after interruption of wireless power reception at the first power level at the wireless power receiver; and establish wireless power reception from the wireless power transmitter at a second power level that is higher than the first power level.

Some embodiments relate to methods of receiving power wirelessly by a wireless power receiver during a wireless power transfer session. Such methods may comprise acts of: establishing wireless power reception from a wireless power transmitter in a first mode of operation; executing an authentication process with the wireless power transmitter; sending session attribute information to memory, wherein the session attribute information includes at least some information relating to the authentication process; receiving session attribute information after interruption of wireless power reception in the first mode of operation at the wireless power receiver; and establishing wireless power reception from the wireless power transmitter in a second mode of operation after receiving the session attribute information.

Some embodiments relate to controllers for a wireless power transmitter that are adapted with code to: establish wireless power transmission to a wireless power receiver at a first power level; execute an authentication process with the wireless power receiver; send session attribute information relating to the authentication process to memory; perform a foreign object detection process during a time when wireless power reception at the first power level at the wireless power receiver is interrupted; and transmit at least some of the session attribute information retrieved from the memory to the wireless power receiver prior to transmitting power wirelessly at a second power level that is higher than the first power level.

Some embodiments relate to methods of transmitting power wirelessly by a wireless power transmitter. Such methods may comprise acts of: establishing wireless power transmission to a wireless power receiver in a first mode of operation; executing an authentication process with the wireless power receiver; performing a foreign object detection process during a time when wireless power reception at the wireless power receiver in the first mode of operation is interrupted after executing the authentication process; re-establishing wireless power transmission to the wireless power receiver in the first mode of operation; and establishing wireless power transmission to the wireless power receiver in a second mode of operation after performing the foreign object detection process.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Wireless power systems can provide a convenient way to provide power from a first device (e.g., wireless power transmitter) which may act as a charging device to a second device needing power (e.g., a wireless power receiver) without the need of plugging and unplugging one or more power chords. In many implementations, the wirelessly provided power can be used to power and/or charge an electronic device. Some wireless power systems can operate in two or more modes of wireless power transfer that may correspond to different levels of wireless power transfer.

For example, a wireless power system 100 (such as the one depicted in FIG. 1) having a transmitter 1 and receiver 11 can operate in a low-power mode. An amount of power transferred in a low-power mode can be 5 watts or less, according to some embodiments. In some cases, such a mode may be referred to as a "basic power performance" mode, though other designations may be used. Power levels delivered to foreign objects and wireless power receivers at low-power modes of operation may not cause high heating conditions or exceed standard operating conditions for the receivers. Heating may be caused, for example, by a foreign object 20 (such as a paper clip, coin, etc.) that is inadvertently located in a wireless power transfer region between the two devices. In the wireless power transfer region, electromagnetic fields can impinge on the foreign object 20 and potentially generate currents in the foreign object, which may be dissipated as heat.

Figure 1:
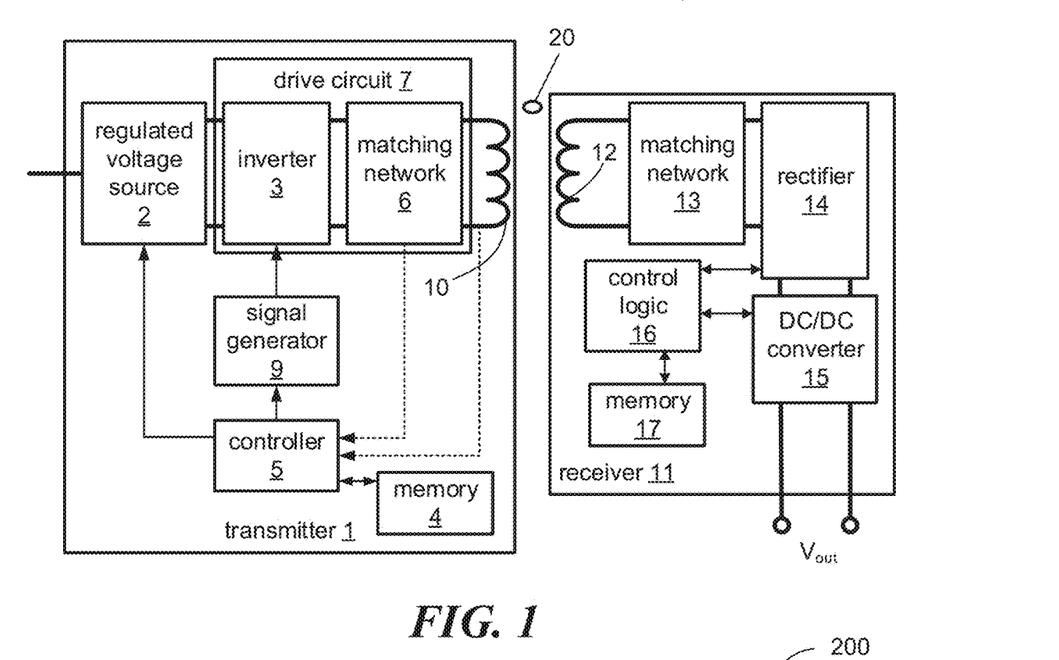
FIG. 1 is a block-diagram depiction of a wireless power system including a wireless power transmitter and a wireless power receiver, according to some embodiments.

Foreign objects 20 can also adversely affect efficiency of wireless power transfer. Wireless power transfer can be degraded due to the presence of a conductive foreign object 20 in the field produced by the wireless power transmitter. A conductive and/or metallic object may absorb power due to the inducement of currents in the object. If a metal object is present, efficiency of power transfer may be reduced substantially (e.g., from 90% to 40%). Therefore, it can be beneficial to detect foreign objects and calibrate the wireless power system 100 to account for the foreign object(s) prior to providing power wirelessly at any power level for an extended period of time.

A wireless power system 100 can operate in one or more high-power modes. For example, a high-power mode may be a mode in which wireless power transfer at power levels over 5 watts can occur. In some cases, a high-power mode may transfer power levels from 5 watts up to 15 watts, or even higher. Such a mode or modes may be referred to as "extended power performance," though other designations may be used. As may be appreciated, undesirable power loss and heating conditions can increase with increased power-transfer levels. Accordingly, it can be beneficial to further perform foreign-object detection (FOD) and calibration to account for foreign objects before entering high-power modes as well as performing FOD intermittently during operation in high-power modes.

Some wireless power receivers 11 may not be configured to handle high levels of power transfer from a wireless power transmitter 1. For example, they may have internal electronic components that are not rated for the higher power levels that a transmitter 1 can provide. For such receivers, an authentication procedure may be implemented before attempting to enter high-power modes of operation. An authentication procedure may determine, for example, that a receiver 11 complies with a standard (such as the Qi standard) to which the transmitter 1 also complies and is rated for one or more high-power modes of operation.

The inventor has recognized and appreciated that an authentication procedure between a wireless power transmitter 1 and wireless power receiver 11 can take an appreciable amount of time (e.g., more than 5 seconds, more than 10 seconds, or more than 20 seconds in some cases). During such time intervals, conditions relating to a foreign object 20 can change. For example, the foreign object if present may be moved, or a foreign object 20 may be inadvertently placed in the wireless power transfer region during the time interval. Therefore, FOD and calibrations performed in a low-power mode of operation may no longer be valid when entering a high-power mode of operation after performing a lengthy authentication procedure. The change in foreign object conditions may result in an undesirable operating condition if high-power operation is allowed.

Further details of a wireless power transfer system 100 and foreign object detection are now described briefly before describing methods to avoid undesirable operating conditions when performing authentication procedures and transitioning to high-power operating modes.

FIG. 1 shows a block diagram of a wireless power system 100 including a wireless power transmitter 1 and a wireless power receiver 11. The wireless power transmitter 1 has a drive circuit 7 that can include an inverter 3 and matching network 6. The inverter 3 can drive a transmit coil 10 and be impedance matched to the transmit coil through a matching network 6.

According to some embodiments, the wireless power transmitter 1 can further include a regulated voltage source 2 (e.g., a voltage regulator) that provides a regulated DC voltage to the inverter 3. The regulated voltage source 2 produces a regulated DC output voltage in response to control stimulus from the controller 5. In some embodiments, the drive circuit 7 may be a class D or E amplifier that converts the DC voltage at the input of inverter 3 into an AC output voltage to drive the transmit coil 10. Producing an AC output voltage enables wireless power transmission through electromagnetic induction.

The controller 5 may also control a signal generator 9 to drive the inverter 3 with signals of a selected wireless power transmission frequency. As an example, the inverter 3 may be switched at a frequency between 100 and 205 kHz to transmit power to a wireless power receiver designed to receive wireless power according to the Qi specification for low power Qi receivers and 80-300 kHz for medium power Qi receivers. The inverter 3 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are provided merely by way of example, as wireless power may be transmitted at a variety of suitable frequencies, in accordance with any suitable specification. Controller 5 may be an analog circuit or a digital circuit. Controller 5 may be programmable, and may command signal generator 9 to produce signals at a desired transmission frequency based on stored program instructions, so that inverter 3 switches at the desired transmission frequency.

Matching network 6 may comprise one or more impedance-matching networks and facilitate wireless power delivery by presenting a suitable impedance to the inverter 3. The matching network(s) may have one or more capacitive or inductive elements or any suitable combination of capacitive and inductive elements. Since the transmit coil 10 may have an inductive impedance, in some embodiments the matching network 6 may include one or more capacitive elements, which, when combined with the impedance(s) of the transmit coil 10, presents an impedance to the output of inverter 3 suitable for driving the transmit coil 10. For example, the matching network may rotate an input impedance of the transmit coil 10 to approximately an output impedance of the inverter 3, so as to reduce power reflection that would otherwise occur from the transmit coil 10. In some embodiments, during wireless power transfer, the resonant frequency of the matching network 6 and transmit coil 10 can be adjusted (e.g., by variable capacitors and/or switching in and out capacitors) and can be set equal to or approximately equal to the switching frequency of the inverter 3.

The transmit coil 10 and receive coil 12 may be realized by any suitable type of conductors. The conductors may be wires, including solid, single-core wire or Litz wire. In some cases, a coil can be formed from patterned conductors, such as patterned conductors of a printed-circuit board or an integrated circuit.

AC current that is driven in the transmit coil 10 can generate an oscillating magnetic field in accordance with Ampere's law. The oscillating magnetic field can induce an AC current in, and voltage across, a nearby receiver coil 12 of the wireless power receiver 11 in accordance with Faraday's law. The AC voltage induced across the receiver coil 12 is provided through a matching network 13 to a rectifier 14 that generates an unregulated DC voltage. Rectifier 14 may be a synchronous rectifier or may be implemented using diodes and one or more capacitors. The unregulated DC voltage can be regulated using a DC/DC converter 15, the output of which may be filtered and provided to a load as output voltage $V_{out}$. In some alternate embodiments the DC/DC converter 15 can be replaced by a linear regulator or battery charger, or eliminated altogether.

According to some implementations, a wireless power receiver 11 may include memory 17 and control logic 16. Control logic 16 can comprise application-specific circuitry (such as an application-specific circuit formed of logic gates and buffers, among other circuit components), one or more field-programmable gate arrays, a microcontroller, a microprocessor, or some combination thereof. The memory can include one or both of volatile and non-volatile types of memory. The control logic 16 can be in communication with the memory 17 and may further be in communication with one or both of the rectifier and DC/DC converter or linear regulator or battery charger.

In some embodiments, the wireless power transmitter 1 may have communication circuitry (e.g., within or connect to controller 5) for communicating with wireless power receiver 11. The communication can be through in-band communication or out-of-band communication. Similarly, wireless power receiver 11 may have communication circuitry (e.g., within or connected to control logic 16) for communicating with a wireless power transmitter 1. According to some embodiments, the wireless power receiver 11 may send information to the wireless power transmitter 1 indicating the power demanded at the wireless power receiver 11, or request a change in the power level to be provided by the wireless power transmitter 1. In response, the wireless power transmitter 1 may increase or decrease its power output accordingly. The wireless power transmitter 1 may control the amount of power transmitted by varying the voltage drive level applied to the transmit coil 10, the frequency of the oscillating voltage applied to the transmit coil 10, or both. Any suitable power control techniques may be used.

As illustrated in FIG. 1, a conductive foreign object 20 may enter a wireless power transfer region in which the field produced by the transmit coil 10 of the wireless power transmitter 1 is present. If so, the wireless power transmission efficiency can be degraded and/or power can be dissipated and lost in the conductive foreign object 20. Examples of conductive foreign objects 20 include, but are not limited to coins, paperclips, keys, jewelry, pens, pencils, metalized pharmaceutical or medical objects, metal personal care products, etc.

According to some embodiments, a wireless power transmitter 1 can be configured to perform foreign object detection automatically, or semi-automatically, prior to and/or during wireless power transmission. By performing foreign object detection and/or foreign object calibration, a wireless power transmitter 1 can determine whether or not to perform wireless power transmission to a receiver 11.

In some implementations, foreign object detection can be performed by measuring a quality factor Q associated with the transmit coil 10. For example, the wireless power transmitter 1 can excite a resonance in the transmit coil 10 and then allow the stored energy to decay. The observed rate of decay is dependent upon the Q of the transmit coil and parameters of the circuit in which it exists, and can also be affected by the presence of any foreign objects 20 that can interact with the electromagnetic field produced by the transmit coil 10. Examples of foreign object detection methods are described in further detail in U.S. patent application Ser. No. 15/957,704, titled "Detecting Foreign Objects in Wireless Power Transfer Systems," filed Apr. 19, 2018, which application is incorporated herein by reference in its entirety.

According to some embodiments, a method referred to as "loss balancing" can be used alternatively or additionally to determine an effect of foreign objects 20 on wireless power transfer. In loss balancing, power losses associated with the wireless power transmitter 1 and wireless power receiver 11 are known or predetermined (e.g., determined during manufacture of the devices). During power transfer, an amount of power received by the receiver 11 can be communicated to the wireless power transmitter. A difference between an expected amount of power received (based on power transmitted, transmitter losses, and receiver losses) and the actual power received can be attributed, at least in part, to power loss associated with one or more foreign objects.

In some implementations, if the power loss associated with foreign object(s) exceeds a threshold value during a loss-balancing calibration, wireless power transfer will be interrupted so that the foreign object 20 can be removed. Some standards, such as the Qi standard, may have several threshold values that depend upon the mode of operation. For example, wireless power transfer may be interrupted if power loss associated with a foreign object exceeds 350 milliwatts in a low-power mode of operation and exceeds 750 milliwatts in a high-power mode of operation. It will be appreciated that other threshold values may be used in the Qi standard or other standards, and the invention is not so limited to only these example values.

Figure 2A:
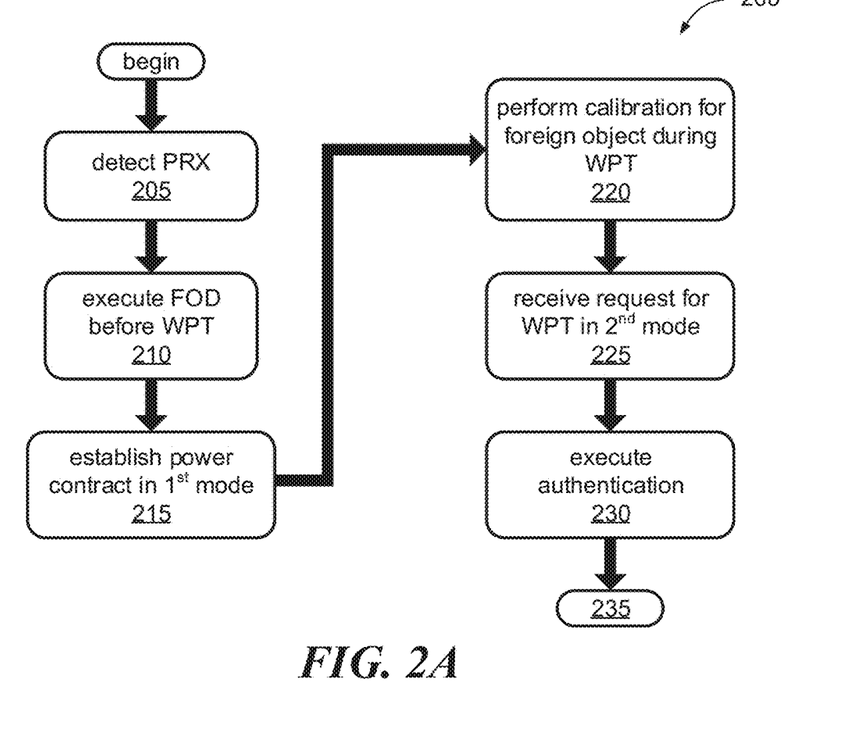
FIG. 2A depicts an example of acts associated with wireless power transfer methods that can be performed by a wireless power transmitter, according to some embodiments.
Figure 2B:
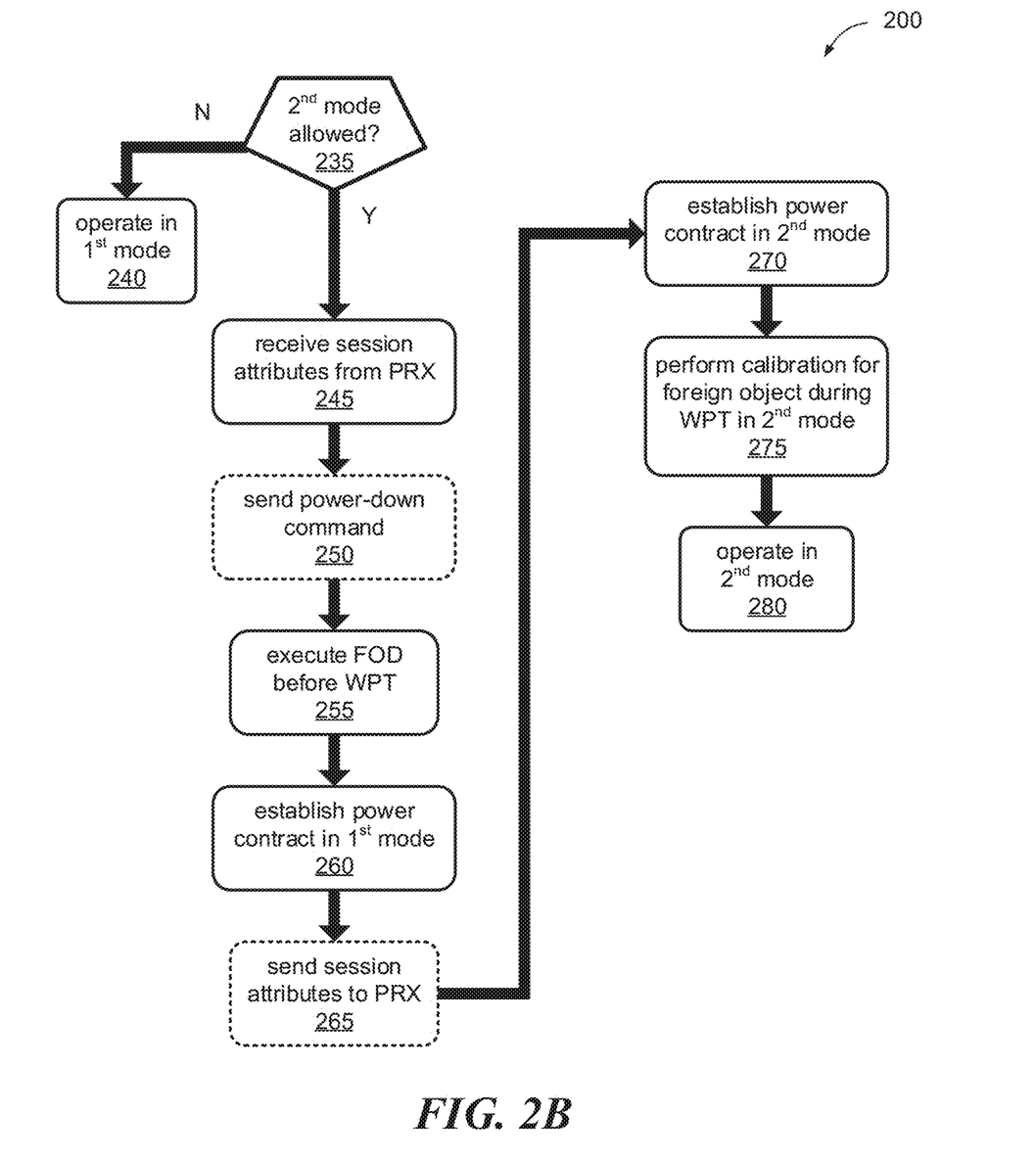
FIG. 2B depicts an example of acts associated with wireless power transfer methods that can be performed by a wireless power transmitter, according to some embodiments.
Figure 3:
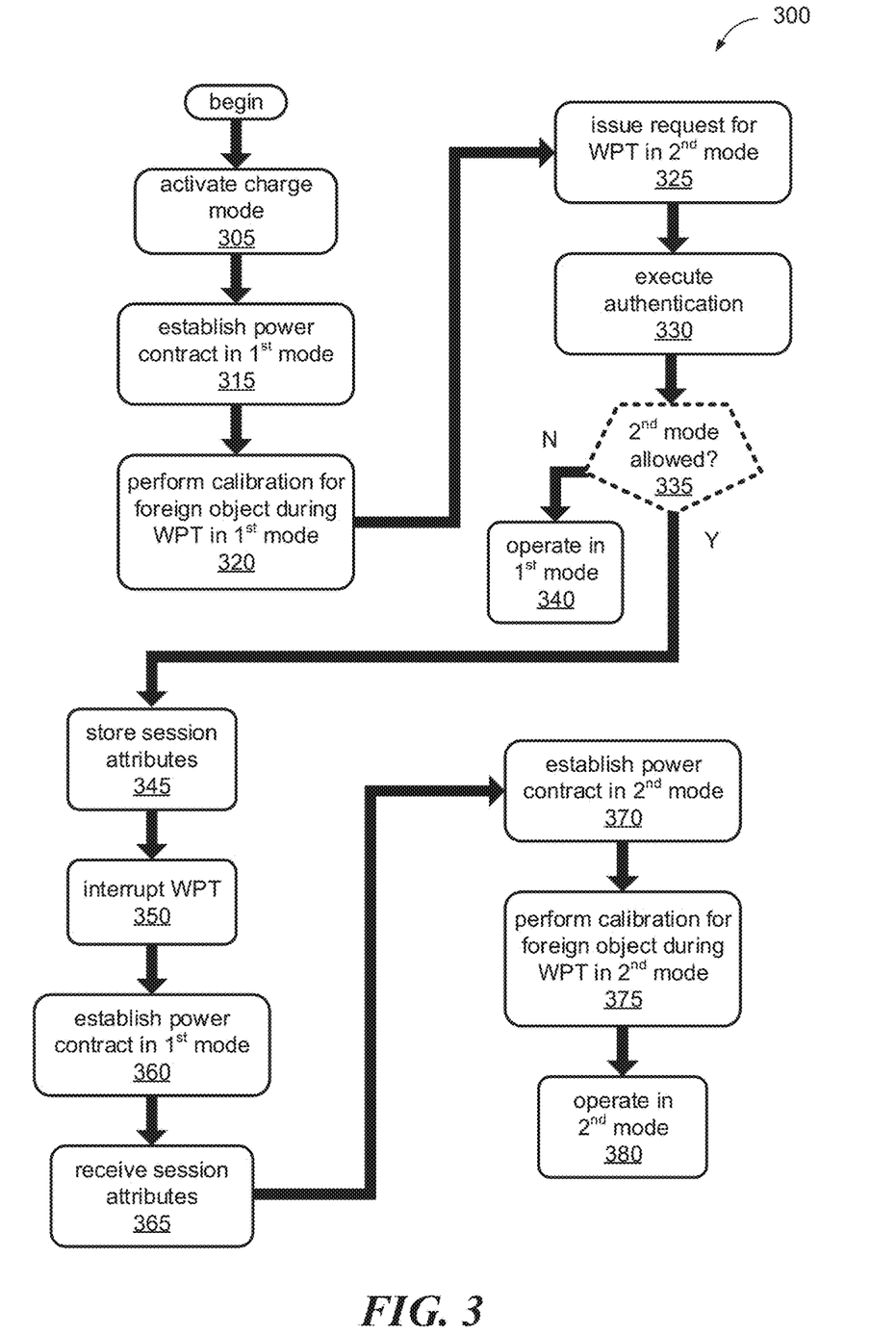
FIG. 3 depicts an example of acts associated with wireless power transfer methods that can be performed by a wireless power receiver, according to some embodiments.

Acts associated with methods for wireless power transfer in different modes of operation, authentication, and detection of foreign objects are listed in the flow diagrams of FIG. 2A, FIG. 2B, and FIG. 3. Acts described in FIG. 2A and FIG. 2B can be performed by a wireless power transmitter. Acts described in FIG. 3 can be performed by a wireless power receiver. The acts can significantly reduce the impact of a lengthy authentication process on transitioning to a high-power mode of wireless power transfer.

According to some embodiments, a method 200 of wireless power transfer may begin after a wireless power transmitter 1 is turned on and detects (act 205) a wireless power receiver (abbreviated as PRX) in a wireless power transfer region. The wireless power receiver 11 may be detected, in some cases, by the transmitter 1 issuing a digital or analog ping that can induce a response from the wireless power receiver. For example, the wireless power receiver 11 may return identification information and/or a request for wireless power transfer.

A wireless power transmitter 1 may then begin a wireless power transfer session with the receiver and execute (act 210) a foreign object detection process before transmitting power wirelessly to the wireless power receiver 11. An example of a FOD process may comprise evaluating a quality factor Q of the transmit coil 10, as described above. The wireless power transmitter 1 and wireless power receiver 11 may establish (act 215) a power-transfer contract in a first mode of operation. The power contract in the first mode of operation may include specifications for oscillation frequency and/or amplitude of modulation (e.g., peak-to-peak voltage) at one or both of the transmitter and receiver. In some cases, a power metric may be included in the power contract, such as average power detected at one or both of the transmitter and receiver. The terms of the power contract may be used to establish wireless power transmission to the wireless power receiver 11 at a first power level associated with the first mode of operation.

Having established a power contract, a wireless power transmitter 1 may perform (act 220) a calibration process for wireless power transfer, for which one or more foreign objects may or may not be present in the wireless power transfer region. The calibration process may determine power-transfer loss associated with the foreign object and adjust wireless power transfer parameters (e.g., frequency and/or voltage levels) to reduce such losses. According to some implementations, the power-transfer loss may be determined by a loss-balancing process, as described above.

In many wireless power transfer sessions, a wireless power receiver 11 may issue a request for wireless power transfer in a second mode of operation that involves a higher power level than the first mode of operation. The request can come, in some cases, immediately after the wireless power transmitter 1 performs (act 220) a calibration process. The request can be received (act 225) by the wireless power transmitter 1. In some wireless power-transfer protocols or standards, wireless power transfer at the higher power level may not be permitted unless an authentication process is executed and completed successfully between the wireless power transmitter 1 and wireless power receiver 11. The authentication process ostensibly can avoid undesirable operating conditions that are described above (e.g., attempting to transfer a high power level to a device that is not rated for the power level or is not certified and registered to handle the higher power level). In response to a request for wireless power transfer in a second mode of operation, a wireless power transmitter 1 and wireless power receiver 11 can execute (act 230) an authentication process. In some cases, the authentication process can involve a lengthy process of information exchange by means of in-band or out-of-band communication between the two devices. In some implementations, the wireless power receiver 11 initiates the authentication process. In some cases, the wireless power transmitter 1 can initiate the authentication process.

The authentication process can involve determining the identity and/or type of wireless power receiver 11, and determining that the receiver is rated for a high-power level. In some cases, the authentication process can involve making the identity and/or type of the wireless power transmitter 1 known to the receiver 11 and confirming, by the receiver 11, that the transmitter has been manufactured in accordance with acceptable industry specifications and established quality control procedures (e.g., complies with industry standards). The authentication process may include retrieval of a secure key or a public key by one or both of the transmitter 1 and receiver 11, according to some embodiments.

As explained above, an authentication process can take a significant amount of time compared to other wireless power-transfer processes that are executed before wireless power transfer at a particular power level commences. As an example, the time associated with acts 205 through 225 in FIG. 2A may take approximately 1.5 seconds for a wireless power receiver 11 and wireless power transmitter 1 operating according to the Qi standard. Executing an authentication process (act 230) can take approximately 20 seconds or significantly more in some cases. As noted above, the inventor has recognized and appreciated that such an interval of time can allow for changes in foreign object conditions and possibly result in an undesirable operating condition. The acts of FIG. 2B can greatly reduce the chances that such undesirable operating conditions could arise.

According to some embodiments and referring to FIG. 2B, after an authentication process is completed, a method 200 of wireless power transfer may continue with determining (act 235) whether operation in the second mode is allowed. For example, if the authentication process could not complete successfully (which can occur if the transmitter 1 or receiver 11 does not comply with a same wireless power-transfer standard as the receiver 11 or transmitter 1, respectively, or cannot complete a key deciphering process), then the wireless power receiver 11 and wireless power transmitter 1 can operate (act 240) in the first mode of operation for the remainder of the wireless power-transfer session.

On the other hand, if it is determined (act 235) that operation in the second mode is allowed (e.g., authentication completes successfully), then the wireless power transmitter 1 can execute several acts in preparation for power transfer at a higher power level. In some implementations, a wireless power transmitter 1 may receive (act 245) at least some session attributes from a wireless power receiver 11 and store the session attributes. The session attributes can contain information relevant to a particular wireless power transfer session (e.g., operating information for the receiver 11 and/or transmitter 1). In some cases, session attributes can include authentication information from a successfully-completed authentication process. The authentication information may include information relevant to the receiver's and/or transmitter's successful completion of the authentication process (e.g., information needed for or resulting from the authentication process). In some cases, the authentication information may include confirmation information from the receiver that authentication has been completed successfully. Additionally or alternatively, session attributes may contain other information that can be unique to the current session (e.g., any one or some combination of: receiver identification, randomly generated number, an encrypted key, time, date, power level, oscillation frequency, etc.). The session attributes can be sent to a data storage location (e.g., volatile or non-volatile memory 4 that is a part of, and/or in communication with, the transmitter's controller 5). Later, at least some of the session attribute information can be retrieved and used to more quickly transition from a first mode of operation to a second mode of operation. The session attributes may also include authentication information from the wireless power transmitter 1. In some cases, at least some of the session attribute information can be sent back to the receiver at a later time so that the receiver can use the session attribute information to quickly proceed with wireless power transfer at a second power level. Session attribute information may be produced by one or both of the transmitter 1 and receiver 11.

According to some embodiments, a method 200 may include sending (act 250) a power-down command to a wireless power receiver 11 that induces the receiver to interrupt temporarily power transfer from its receive coil 12 at the first power level. In some cases, the receiver may completely power down. In other cases, the wireless power receiver 11 may disable power draw from its receive coil, and yet continue a low-power draw from an in-device power-storage element, such as a bulk capacitor of the rectifier 14. In some implementations, charge stored in the bulk capacitor can be used to reverse bias diodes of the rectifier to essentially block current draw from the receive coil 12 for a brief period of time. Such a brief period of time can allow the wireless power transmitter 1 to execute (act 255) foreign object detection again (e.g., evaluate the Q factor) before initiating wireless power transfer in a first mode of operation.

According to some embodiments, instead of sending (act 250) a power-down command to the wireless power receiver 11, the transmitter may temporarily interrupt wireless power transfer to the receiver 11 at the first power level, such that power reception at the receiver 11 at the first power level is temporarily interrupted. During the temporary interruption, the transmitter 1 can execute (act 255) foreign object detection. Accordingly, the receiver 11 may initiate interruption of wireless power reception at the first power level or the transmitter 1 may initiate interruption of wireless power transmission from the transmitter 1 and reception at the receiver 11 at the first power level.

When executing (act 255) foreign object detection, the transmitter 1 may reduce power to its transmit coil 10 (compared to a previous level for wireless power transfer during the session), so that a low level of voltage and power is generated at the receive coil 12. Reducing the power to the transmit coil 10 can make it easier for the receiver 11 to interrupt received power from its receive coil 12.

In some cases, a power-down command may not be sent to the wireless power receiver 11. Instead, the wireless power receiver may automatically power down after the authentication process and signal to the wireless power transmitter 1 when it is powering down and/or disabling its receive coil 12. Therefore, the act of sending (act 250) a power-down command may not be performed by a wireless power transmitter 1 and not included in method 200 (as indicated by the dotted line). In some cases, the wireless power transmitter 1 may receive a signal from the wireless power receiver 11 that it is powering down and/or disabling its receive coil 12.

A method 200 of performing wireless power transfer by a transmitter may include executing (act 255) foreign object detection and establishing (act 260) a power contract for wireless power transfer in a first mode of operation. These two acts may be essentially the same as acts 210 and 215 described above. The receiver 11 may power up and/or signal that it has powered up or is ready for wireless power transfer after foreign object detection (act 255) has been performed. If the wireless power transmitter 1 has received (act 245) session attributes from the wireless power receiver 11, then the wireless power transmitter 1 may send (act 265) session attribute information back to the wireless power receiver 11 that has awakened from its power-transfer interruption. If session attributes were not received from the receiver, this step may be omitted from the method 200, as is indicated by the dashed outline. The session attribute information sent to the receiver 11 from the transmitter 1 or received by the receiver 11 from its memory 17 can include information that permits the following two acts of wireless power transfer in the second mode of operation.

A wireless power transmitter 1 can then proceed to establishing (act 270) a power contract with the wireless power receiver 11 in the second mode of operation, which can be a high-power mode. After establishing the power contract, the wireless power transmitter 1 can perform (act 275) a calibration process during wireless power transfer, for which one or more foreign objects 20 may be present in the wireless power transfer region, in the second mode of operation. The calibration process may include acts of loss balancing. The calibration process can occur one or more times while the wireless power transmitter 1 operates (act 280) in the second mode of operation.

In some embodiments, the session attributes can be thought of as a session key that is created as a result of successful completion of the authentication process (act 230). By exchanging the session attributes, the wireless power transmitter 1 and wireless power receiver 11 can quickly proceed from the second act of establishing a power contract (act 260) for the first mode of operation to operating (act 280) in the second mode of wireless power transfer. For example, the amount of time after establishing (act 260) the power contract for the first mode of operation to operating (act 280) in the second mode can be approximately 2.5 seconds for a transmitter and receiver operating according to the Qi standard. This can be significantly shorter than and can avoid a much longer delay (e.g., up to 20 seconds or more) associated with the authentication process that would otherwise occur between the two acts of establishing (act 260) a power contract in a first mode of operation and operating (act 280) in a second, higher-power, mode of operation. Because of the significantly reduced time, there can be a much smaller chance that conditions associated with one or more foreign objects 20 could change between, for example, establishing power contracts for the first and second modes of operation. In cases where authentication does not complete successfully (e.g., authentication information is not validated by the receiver 11 or transmitter 1), then the acts of calibration (220, 320) may be repeated after later acts of establishing (260, 360) a power contract in the first mode of operation.

There can be corresponding acts performed by a wireless power receiver 11 during a method 300 of performing wireless power transfer, as depicted in FIG. 3. According to some embodiments, a wireless power receiver 11 may activate (act 305) a charging mode when placed in a wireless power transfer region of a wireless power transmitter 1. In some cases, the charging mode may be activated in response to a ping from the transmitter. In some implementations, the receiver 11 may ping the transmitter 1 to indicate its presence and/or readiness for receiving power wirelessly. A wireless power receiver 11 can participate in establishing (act 315) a power contract in a first mode of operation, in which a wireless power transmitter 1 participates. Establishing a power contract can exchange information, as described above, with the wireless power transmitter 1, and establish wireless power reception at the receiver. A wireless power receiver 11 can further participate in performing (act 320) calibration for power transfer during the first mode of operation, for which one or more foreign objects may be present.

After completing the calibration process, a wireless power receiver 11 can issue (act 325) a request for wireless power transfer in a second mode of operation, and then participate in executing (act 330) an authentication process with the wireless power transmitter 1. The method 300 may or may not further include determining (act 335) whether operation in the second mode is allowed, based on results from executing (act 330) the authentication process. For example, the act or acts 335 of determining may be performed entirely by the wireless power transmitter 1. If the second mode is not allowed (e.g., the authentication process did not complete successfully), then the wireless power receiver 11 may be limited to operating (act 340) in the first mode for the remainder of the wireless power-transfer session.

If the authentication process completes successfully, the wireless power receiver 11 can store (act 345) session attributes. The session attributes can be those described above in connection with act 245. According to some embodiments, the wireless power receiver 11 can store the session attributes locally (e.g., in non-volatile memory), and/or send them to the wireless power transmitter 1 to be stored by the transmitter. According to some embodiments, sending the session attributes to the wireless power transmitter may automatically grant the transmitter permission to proceed with foreign object detection and power transfer at a higher power level.

The wireless power receiver 11 can further interrupt (act 350) wireless power reception from the receive coil 12. In some cases, the interruption of wireless power transfer may be in response to a command issued by the transmitter 1. To interrupt wireless power reception, the receiver may disable power flow from the receive coil 12 as described above. The interruption of wireless power reception can allow the wireless power transmitter 1 to execute (act 255) foreign object detection (e.g., by evaluating the Q factor).

According to some embodiments, the wireless power receiver 11 can further participate in establishing (act 360) a power contract with the wireless power transmitter 1 for the first mode of operation, and then receive (act 365) session attribute information. Session attribute information can be received from the wireless power transmitter 1 in some cases, if stored there during the interruption (act 350) of wireless power reception. In some implementations, session attribute information can be retrieved from local memory (e.g., non-volatile or volatile memory) that is in communication with the receiver 11 or its control logic 16. In some cases, receiving (act 365) session attribute information can include validating the session attribute information by the receiver 11. For example, the receiver may compare received session attribute information against session attribute information that it stored in its memory 17, at the time that the session attribute information was prepared and sent to the transmitter, to verify that at least some of the information matches.

In some embodiments, the receiving (act 365) of the session attribute information can effectively restore authentication status at the wireless power receiver 11, without the transmitter and receiver undergoing the authentication process again. This can allow the wireless power receiver 11 and transmitter 1 to proceed quickly to acts of establishing (acts 370, 270) a power contract in the second mode of operation, performing calibration (acts 375, 275), and operating (acts 380, 280) in the second mode. When establishing (act 370) power contract in the second mode of operation, the wireless power receiver 11 may transmit at least some of the session attribute information stored with the session attributes to the wireless power transmitter 1.

In embodiments of wireless power transfer methods 200, 300, acts associated with retrieval and use of session attributes can be thought of as an abbreviated authentication process or re-authentication process that is performed after interruption (act 350) of wireless power reception by the wireless power receiver 11. In some cases, the re-authentication can be checked by only one device. For example, only the wireless power transmitter 1 may check for valid session attribute information provided by the wireless power receiver 11 when transitioning to the second mode of operation (e.g., while establishing (act 370) a power contract in the second mode of operation). In other embodiments, both the wireless power receiver 11 and transmitter 1 may check session attribute information when transitioning to the second mode of operation. For example, the wireless power receiver 11 may check retrieved session attribute information (from act 365) to determine that the session is being maintained with the same wireless power transmitter 1.

The methods 200, 300 described above pertain to two modes of operation, a low-power mode (e.g., a basic performance mode) and a high-power mode (e.g., an extended performance mode). The methods can apply to more modes of operation (e.g., additional high-power modes of operation). In some cases, the two modes of operation may pertain to transitions up or down in power level. For example, whenever an increase or decrease in power level is requested by a wireless power receiver 11, storage and/or exchange of session attributes, interruption of wireless power transfer, foreign object detection, and re-establishment of wireless power transfer can occur. As such, the first mode and second mode in the illustrated methods 200, 300 may pertain to high-power and low-power modes, respectively.

As may be further appreciated, the methods 200, 300 can pertain to transitions from non-privileged modes of operation (analogous to the low-power mode) and privileged modes of operation (analogous to the high-power mode). A non-privileged mode may be a basic power transfer mode that is widely available to wireless power receivers and wireless power transmitters. For example, neither the wireless power receiver and wireless power transmitter need be certified or authorized to access the non-privileged mode of operation. A privileged mode of operation may be a mode that contains higher performance features (e.g., energy saving features, higher power transfer, device diagnostic features, etc.). A privileged mode need not involve power transfer at a higher power level than a non-privileged mode. As such, the first mode and second mode in the illustrated methods 200, 300 may pertain to non-privileged and privileged modes, respectively.

As an example, a method of receiving power wirelessly by a wireless power receiver during a wireless power transfer session may include acts of: establishing wireless power reception from a wireless power transmitter in a non-privileged mode of operation; executing an authentication process with the wireless power transmitter; sending session attribute information to memory, wherein the session attribute information includes at least some information relating to the authentication process; receiving session attribute information after interruption of wireless power reception in the non-privileged mode of operation at the wireless power receiver; and establishing wireless power reception from the wireless power transmitter in a privileged mode of operation after receiving the session attribute information. Circuit control logic may be configured to operate in this manner.

As another example, a method of transmitting power wirelessly by a wireless power transmitter may comprise acts of: establishing wireless power transmission to a wireless power receiver in a non-privileged mode of operation; executing an authentication process with the wireless power receiver; performing a foreign object detection process during a time when wireless power reception at the wireless power receiver at the first power level is interrupted after executing the authentication process; re-establishing wireless power transmission to the wireless power receiver in the non-privileged mode of operation; and establishing wireless power transmission to the wireless power receiver in a privileged mode of operation after performing the foreign object detection process. Circuit control logic may be configured to operate in this manner.

The methods 200, 300 of wireless power transfer described above in connection with FIG. 2A through FIG. 3 include various functionalities that can be implemented with logic circuitry or processor(s) and code. Code written to perform such functionalities can be stored on non-transitory computer-readable media, so that it can be loaded on to one or more processors (or used to configure logic circuitry) to adapt the one or more processors (or logic circuits) and related circuitry to perform the functionalities.

Accordingly, a wireless power transmitter 1 may be controlled using controller 5 and a wireless power receiver 11 may be controlled using control logic 16, which may be implemented by suitable logic circuitry. For example, the controller 5 or control logic 16 may be implemented using hardware or some combination of hardware, firmware, and code (software). When implemented using code, suitable code can be executed on a suitable processor (e.g., a microprocessor) or collection of processors. The one or more processors can be implemented in numerous ways, such as with dedicated hardware, or with general purpose hardware (e.g., one or more processors) that is programmed using code to perform the functions described above.

In this respect, it should be appreciated that one implementation of at least a portion of the embodiments described herein comprises at least one computer-readable storage medium (e.g., RAM, ROM, EEPROM, flash memory or other memory technology, or other tangible, non-transitory computer-readable storage medium) encoded with computer code (i.e., a plurality of executable instructions) that, when executed on one or more processors, performs at least some of the above-discussed functionalities of one or more embodiments. In addition, it should be appreciated that the reference to code which, when executed, performs any of the above-discussed functionalities, is not limited to an application program running on a host computer. Rather, the terms code and software are used herein in a generic sense to reference any type of computer code (e.g., application software, firmware, microcode, or any other form of computer instruction) that can be employed to program one or more processors and/or logic circuitry to implement functionalities described herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof is meant to encompass the items listed thereafter and equivalents thereof as well as additional items.

What is claimed is:

1. Control logic for a wireless power receiver configured to adapt the wireless power receiver to:
   establish wireless power reception during a wireless power transfer session from a wireless power transmitter at a first power level;
   after establishing the wireless power reception at the first power level, execute an authentication process with the wireless power transmitter;
   if the authentication process completes successfully, send session attribute information to a memory, wherein, after sending the session attribute information to the memory, there is an interruption of the wireless power reception at the first power level at the wireless power receiver;
   receive the session attribute information from the memory after the interruption of the wireless power reception at the first power level; and
   after receiving the session attribute information from the memory, establish the wireless power reception from the wireless power transmitter at a second power level that is higher than the first power level.

2. The control logic of claim 1 that is further configured to adapt the wireless power receiver to:
   generate the session attribute information;
   validate the received session attribute information; and
   re-establish the wireless power reception from the wireless power transmitter at the first power level before establishing the wireless power reception at the second power level.

3. The control logic of claim 1, wherein the memory is located with the wireless power transmitter.

4. The control logic of claim 1, wherein the session attribute information includes at least one component of information that is particular to the wireless power transfer session.

5. The control logic of claim 1, wherein the session attribute information includes authentication information.

6. The control logic of claim 1, wherein the control logic is further configured to adapt the wireless power receiver to establish the wireless power reception for a second time from the wireless power transmitter at the first power level before the act of receiving the session attribute information.

7. A method of receiving power wirelessly by a wireless power receiver during a wireless power transfer session, the method comprising:
- establishing wireless power reception from a wireless power transmitter in a first mode of operation;
- after establishing the wireless power reception in the first mode of operation, executing an authentication process with the wireless power transmitter;
- sending session attribute information to a memory, wherein the session attribute information includes at least some information relating to the authentication process, and wherein, after sending the session attribute information to the memory, there is an interruption of the wireless power reception in the first mode of operation at the wireless power receiver;
- receiving the session attribute information after the interruption of the wireless power reception in the first mode of operation; and
- establishing the wireless power reception from the wireless power transmitter in a second mode of operation after receiving the session attribute information.

8. The method of claim 7, further comprising:
- generating, by the wireless power receiver, the session attribute information;
- validating the received session attribute information; and
- re-establishing the wireless power reception from the wireless power transmitter in the first mode of operation before establishing the wireless power reception in the second mode of operation.

9. The method of claim 7, wherein the memory is located with the wireless power transmitter.

10. The method of claim 7, wherein the session attribute information includes at least one component of information that is particular to the wireless power transfer session.

11. The method of claim 7, further comprising establishing the wireless power reception for a second time from the wireless power transmitter in the first mode of operation before the act of receiving the session attribute information.

12. The method of claim 7, wherein the second mode of operation comprises wireless power transfer at a higher power level than the first mode of operation.

* * * * *